United States Patent
Atkins et al.

(10) Patent No.: US 9,716,887 B2
(45) Date of Patent: Jul. 25, 2017

(54) CHROMATICITY TRANSLATIONS IN CODING OF ENHANCED DYNAMIC RANGE SIGNALS

(71) Applicant: Dolby Laboratories Licensing Corporation, San Francisco, CA (US)

(72) Inventors: Robin Atkins, Campbell, CA (US); Jon Scott Miller, Harleysville, PA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/370,493

(22) Filed: Dec. 6, 2016

(65) Prior Publication Data
US 2017/0085881 A1    Mar. 23, 2017

Related U.S. Application Data

(62) Division of application No. 14/898,574, filed as application No. PCT/US2014/042583 on Jun. 16, 2014, now Pat. No. 9,584,811.
(Continued)

(51) Int. Cl.
*H04N 19/126*    (2014.01)
*H04N 19/176*    (2014.01)
(Continued)

(52) U.S. Cl.
CPC ......... *H04N 19/126* (2014.11); *H04N 19/136* (2014.11); *H04N 19/176* (2014.11);
(Continued)

(58) Field of Classification Search
CPC .. H04N 19/126; H04N 19/176; H04N 19/182; H04N 19/85
See application file for complete search history.

(56) References Cited

U.S. PATENT DOCUMENTS

| | | |
|---|---|---|
| 5,313,298 A | 5/1994 | Meeker |
| 6,560,285 B1 | 5/2003 | Reitmeier |
| | (Continued) | |

FOREIGN PATENT DOCUMENTS

| | | |
|---|---|---|
| CN | 101742306 | 6/2010 |
| JP | 2006-071332 | 3/2006 |
| | (Continued) | |

OTHER PUBLICATIONS

Buckley, R.R. et al "Invited Address: White-Point Transformations and Color Data Interchange" SID International Symposium Digest of Papers, Boston, May 17-22, 1992, vol. 23, pp. 560-563.
(Continued)

*Primary Examiner* — Nam Pham

(57) ABSTRACT

Methods to reduce chroma-related artifacts during video coding of high dynamic range images are presented. Given an input signal in a color space comprising a luma component and two chromaticity components, a processor determines the original white point chromaticity coordinates (Du, Dv) of a white point in the color space of the input signal. The input signal is translated using a chromaticity translation function to a second signal in a translated color space comprising two translated chromaticity components, wherein the chromaticity translation function shifts the original white point chromaticity coordinates to a predetermined second set of coordinates in the translated chromaticity color space. The second signal is encoded to generate a coded bit stream.

13 Claims, 7 Drawing Sheets

Related U.S. Application Data

(60) Provisional application No. 61/836,044, filed on Jun. 17, 2013, provisional application No. 61/951,914, filed on Mar. 12, 2014, provisional application No. 62/002,631, filed on May 23, 2014.

(51) Int. Cl.
   *H04N 19/182* (2014.01)
   *H04N 19/85* (2014.01)
   *H04N 19/46* (2014.01)
   *H04N 19/136* (2014.01)
   *H04N 19/186* (2014.01)
   *H04N 19/192* (2014.01)
   *H04N 19/36* (2014.01)
   *H04N 19/184* (2014.01)

(52) U.S. Cl.
   CPC ......... *H04N 19/182* (2014.11); *H04N 19/186* (2014.11); *H04N 19/192* (2014.11); *H04N 19/36* (2014.11); *H04N 19/46* (2014.11); *H04N 19/85* (2014.11); *H04N 19/184* (2014.11)

(56) References Cited

U.S. PATENT DOCUMENTS

| | | | |
|---|---|---|---|
| 8,019,150 | B2 | 9/2011 | Bezryadin |
| 8,493,514 | B2 | 7/2013 | Choi |
| 2002/0060688 | A1 | 5/2002 | Mizumoto |
| 2002/0171852 | A1 | 11/2002 | Zhang |
| 2003/0111533 | A1 | 6/2003 | Chang |
| 2007/0086029 | A1 | 4/2007 | Tsai |
| 2012/0013635 | A1* | 1/2012 | Beeman ............... G09G 3/2003 345/590 |
| 2013/0148029 | A1 | 6/2013 | Gish |
| 2014/0247869 | A1 | 9/2014 | Su |
| 2014/0341272 | A1 | 11/2014 | Miller |

FOREIGN PATENT DOCUMENTS

| | | |
|---|---|---|
| JP | 2012-108707 | 6/2012 |
| JP | 2012-147018 | 8/2012 |
| JP | 2012-147022 | 8/2012 |
| JP | 2013-046095 | 3/2013 |
| WO | 2010/104624 | 9/2010 |
| WO | 2010/105036 | 9/2010 |
| WO | 2012/108707 | 8/2012 |
| WO | 2012/147018 | 11/2012 |
| WO | 2012/147022 | 11/2012 |
| WO | 2013/046095 | 4/2013 |
| WO | 2013/086169 | 6/2013 |
| WO | 2014/130343 | 8/2014 |
| WO | 2014/160705 | 10/2014 |

OTHER PUBLICATIONS

Chae, Seok-Min, et al "A Tone Compression Model for the Compensation of White Point Shift Generated from HDR Rendering" IEICE Transactions on Fundamentals of Electronics, Communications and Computer Sciences, Engineering Sciences Society, Tokyo, JP, vol. E95A, No. 8, Aug. 1, 2012, pp. 1297-1301.

Ebner, F. et al "Development and Testing of a Color Space (ipt) with Improved Hue Uniformity" Proc. 6th Color Imaging Conference: Color Science, Systems, and Applications, Scottsdale, Arizona, Nov. 1998, pp. 8-13.

Li, Y. et al "Compressing and Companding High Dynamic Range Images with Subband Architectures" ACM Transactions on Graphics, Jul. 1, 2005, pp. 836-844.

Mai, Z. et al "Optimizing a Tone Curve for Backward-Compatible High Dynamic Range Image and Video Compression" IEEE Transactions on Image Processing, vol. 20, No. 6, Jun. 2011, pp. 1558-1571.

Winken, M. et al "Bit-Depth Scalable Video Coding" IEEE International Conference on Image Processing, Sep. 1, 2007, pp. 1-4.

Winken, M. et al "CE2: SVC Bit Depth Scalability" JVT Meeting MPEG Meeting, Geneva, Jun. 29, 2007-Jul. 5, 2007, Video Team of ISO/IEC JTC1/SC29/WG11 and ITU-T SG.16.

* cited by examiner

CHROMATICITY TRANSLATIONS IN CODING OF ENHANCED DYNAMIC RANGE SIGNALS

CROSS-REFERENCE TO RELATED APPLICATIONS

This application is a divisional of U.S. patent application Ser. No. 14/898,574, filed on Dec. 15, 2015, which is the National Stage entry of PCT Application Ser. No. PCT/US2014/042583, filed on Jun. 16, 2014, which claims the benefit of priority to U.S. Provisional Patent Application No. 61/836,044 filed 17 Jun. 2013; U.S. Provisional Patent Application No. 61/951,914 filed 12 Mar. 2014; and U.S. Provisional Patent Application No. 62/002,631 filed 23 May 2014, each of which is hereby incorporated by reference in its entirety

TECHNOLOGY

The present invention relates generally to video images. More particularly, an embodiment of the present invention relates to the adaptive reshaping of images with high or enhanced dynamic range for layered coding and decoding.

BACKGROUND

As used herein, the term 'dynamic range' (DR) may relate to a capability of the human psychovisual system (HVS) to perceive a range of intensity (e.g., luminance, luma) in an image, e.g., from darkest darks (blacks) to brightest brights (whites). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is simultaneously perceivable by a HVS. As used herein, EDR may relate to a DR that spans 5 to 6 orders of magnitude. Thus while perhaps somewhat narrower in relation to true scene referred HDR, EDR nonetheless represents a wide DR breadth.

In practice, images comprise one or more color components (e.g., luma Y and chroma Cb and Cr) wherein each color component is represented by a precision of n-bits per pixel (e.g., n=8).). Although luminance dynamic range and bit depth are not equivalent entities, they are often related. Images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

Video signals may be characterized by multiple parameters, such as bit-depth, color space, color gamut, and resolution. Modern televisions and video playback devices (e.g., Blu-ray players) support a variety of resolutions, including standard-definition (e.g., 720×480i) and high-definition (HD) (e.g., 1920×1080p). Ultra high-definition (UHD) is a next generation resolution format with at least a 3,840×2,160 resolution (referred to as 4K UHD) and options to go as high as 7680×4320 (referred to as 8K UHD). Ultra high-definition may also be referred to as Ultra HD, UHDTV, or super high-vision. As used herein, UHD denotes any resolution higher than HD resolution.

To support backwards compatibility with legacy, 8-bit, playback devices as well as new HDR or UHD coding and display technologies, multiple formats may be used to deliver UHD and HDR (or EDR) video data from an upstream device to downstream devices. Given an EDR stream, some decoders may use a set of 8-bit layers to reconstruct an HD SDR or EDR version of the content. Advanced decoders may use a second set of layers, coded at a higher bit depth than the traditional 8 bits, to reconstruct an UHD EDR version of the content to render it on more capable displays. As appreciated by the inventor here, improved techniques for the coding and distribution of EDR video are desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
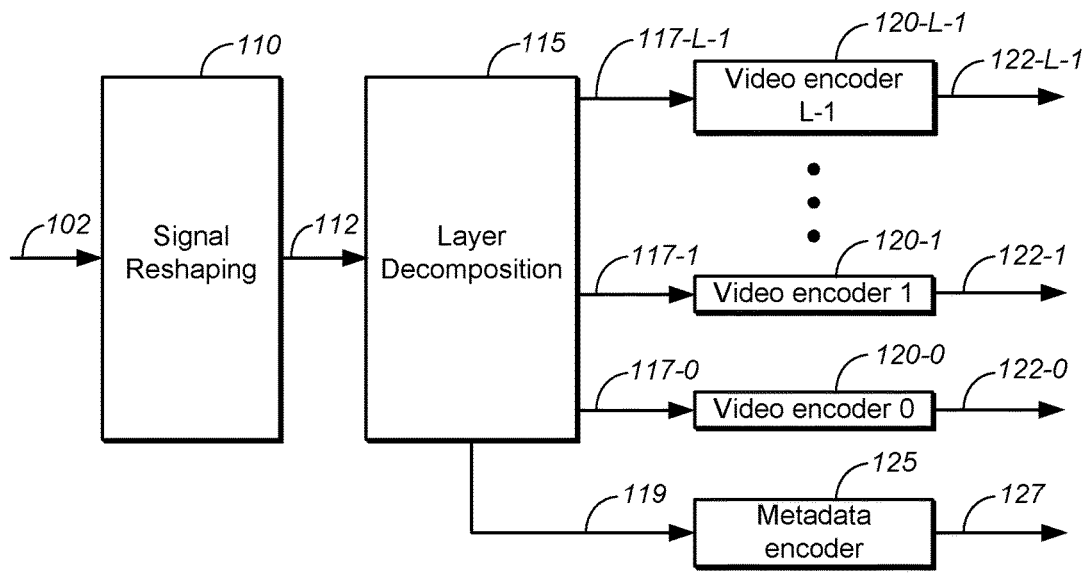
FIG. 1A depicts an example framework of EDR layered encoding according to an embodiment of the present invention.

Adaptive reshaping techniques for the layered coding of video images with enhanced dynamic range (EDR) are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the adaptive reshaping of video images with high or enhanced dynamic range for efficient layered coding. An encoder receives an input enhanced dynamic range (EDR) image to be coded in a layered representation. Input images may be gamma-coded or perceptually-coded using a bit-depth format not supported by one or more of available video encoders. The input image is remapped to one or more quantized layers to generate output code words suitable for compression using the available video encoders.

In one embodiment the remapping is based on a power-function using a single function parameter. Techniques are presented to determine the optimum function parameter based on computing a block-based complexity measure for each block in the input EDR image and then evaluating the amount of the quantization-induced distortion in the quantized image.

In another embodiment, an optimal mapping is generated using a block-based complexity metric, such as the standard deviation, and a block-based linear quantization model, where a separate optimal quantizer scaler is determined for each image block. The separate optimal scalers are combined to determine an envelope slope for each input code word, and an optimal forward mapping function between input and output code words is determined based on the envelope slopes. A reverse mapping function may be transmitted to a decoder as a look-up table or it may be approximated using a piecewise polynomial approximation.

In another embodiment, given a reverse mapping lookup table, the inverse mapping function is approximated using a piece-wise polynomial approximation technique.

In a decoder, the coded bitstream layers are decoded to generate decoded video layers which are recombined to generate a single decoded signal. Then, given received parameters that define the encoder reshaping or mapping functions, the decoded signal is inversely mapped to generate an estimate of the original EDR signal transmitted from an encoder to the decoder.

In another embodiment, the chromaticity color components of the input video signal may be translated so that the coordinates of a desired white point are approximately shifted to the center of the translated chromaticity range.

Example Framework for Video Signal Reshaping and Layered Decomposition
Layered Coding and Decoding Existing display and play-back devices, such as HDTVs, set-top boxes, or Blu-ray players, typically support signals of up to 1080p HD resolution (e.g., 1920×1080 at 60 frames per second). For consumer applications, such signals are now typically compressed using a bit-depth of 8 bits per pixel per color component in a luma-chroma color format where typically the chroma components have a lower resolution than then luma component (e.g., the YCbCr or YUV 4:2:0 color format). Because of the 8-bit depth and the corresponding low dynamic range, such signals are typically referred to as signals with standard dynamic range (SDR). As new television standards are being developed, such as Ultra High Definition (UHD), it may be desirable to encode signals with enhanced resolution and/or enhanced dynamic range.

Video images are typically gamma-encoded to compensate for properties of the human vision system. For example, ITU-R Rec. 2020 defines the recommended gamma encoding of UHDTV signals. For EDR images, perceptual quantization (PQ), may provide a better alternative to traditional gamma coding. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. A perceptual quantizer function maps linear input gray levels to output gray levels that better match the contrast sensitivity thresholds in the human visual system. Examples of PQ mapping functions are described in PCT Application with Ser. No. PCT/US2012/068212 (to be referred as the '212 application) titled "Perceptual luminance nonlinearity-based image data exchange across different display capabilities," by J. S. Miller et al., filed on Dec. 6, 2012, and incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve, as determined by the '212 application, imitates the true visual response of the human visual system using a relatively simple functional model.

In U.S. Provisional Application Ser. No. 61/805,388, to be referred from now on as the '388 application, titled "Encoding perceptually-quantized video content in multi-layer VDR coding," filed on Mar. 26, 2013 and incorporated herein by reference in its entirety, (filed also as PCT/US2014/031716 on Mar. 25, 2014), the inventors described an image reshaping technique for the efficient coding and transmission of PQ-coded EDR image data using a two-layer encoder. This application expands upon the '388 application by describing novel mapping or reshaping techniques applicable to coding EDR data using both single-layer or multi-layer encoders.

FIG. 1A depicts an example framework of EDR layered encoding according to an embodiment of the present invention. Input signal (102) comprises a sequence of video frames with EDR pixel values that may have been gamma- or PQ-encoded. The system includes at least one base-layer (BL) video encoder (120-0) and may include one or more enhancement-layer (EL) video encoders (120-1, 120-L−1), up to L−1, for a total of L encoding layers. For example, for L=2, the system comprises a dual-layer encoder. Video encoders (120) may all be the same or different, implementing any of the known or future coding formats for video compression, such as: MPEG-2, MPEG-4, part 2, H.264 (or AVC), H.265 (or HEVC), and the like. Furthermore, a video encoder in one layer may support a different bit depth than a video encoder in another layer. For example, without loss of generality, embodiments may include the following configurations:

- A single layer, HEVC encoder, supporting at least a bit depth of 10 bits, but preferably supporting 12 bits or more.
- A dual layer encoder, where both encoders may encode using the same format, say H.264, and both encoders support the same or different bit depths (say, 8 bits and 10 bits)
- A dual-layer encoder, wherein the two encoders may encode using different coding formats and each one may support different bit depths (say, 8-bits, and 10-bits or more)
- A multi-layer encoder, where at least one encoder is an 8-bit MPEG-2 encoder and at least one other encoder is either an HEVC or H.264 encoder.

Video encoders (120) may all be implemented by a single processor or by one or more processors.

According to an embodiment, a signal reshaping module (110) quantizes the input EDR signal (denoted as v) (102) into a signal s (112) that fits better the characteristics of the video encoders (120), such as the maximum supported bit depth. As used herein, the terms reshaping, quantization, and (forward) mapping denote equivalent functionality of mapping an input signal from a first dynamic range into an output signal of a second dynamic range, typically lower than the first dynamic range, and may be used interchangeably.

Let $B_l$ denote the bit-depth used by the l-th layer video encoder (120-l, l=0, 1, 2, . . . , L−1), then, each layer can support up to $N_l = 2^{B_l}$ input code words for a total of $N_T = N_0 + N_1 + \ldots + N_{L-1}$ code words. For example, for L=1 (single layer) and $B_0$=10, there exist $2^{10}$=1024 quantized code words. For L=2 (dual layer) and $B_0 = B_1 = 8$, then there exist $2^8 + 2^8 = 512$ quantized code words. When L=2 and $B_0 = 10$ and $B_1 = 8$, then there exist a total of the $2^{10} + 2^8 = 1280$ quantized code words. Hence, the system may accommodate any combination of video coding standards, each one operating at its own bit-depth.

Let s=f(v) denote the signal reshaping/quantization function (110). Examples of such functions will be described in more detail later on. Parameters identifying the reshaping function may be included in a metadata signal (119). In some embodiments the metadata (119) may be encoded by metadata encoder (125), and the coded metadata (127) may be signaled to a decoder, as the one depicted in FIG. 1B, for proper inverse quantization and decoding. In another embodiment, signal reshaping (110) may comprise a family of signal reshaping functions, using separate shaping functions for one or more layers or one or more chroma components within a layer. For example, in an embodiment, the signal reshaping function for the base layer (l=0) may be a linear function, while the signal reshaping function for the first enhancement layer (l=1) may comprise a non-linear function or a piece-wise linear function.

Layer Decomposition

In an embodiment, let pixel values of quantized signal s (112) be partitioned into L segments defined by segment borders $\{p_i, i=0, 1, \ldots, L\}$, where $p_0$ denotes typically the smallest possible value for s (e.g., $p_0=0$) and $$p_i = \sum_{j=0}^{i-1} N_j \text{ for } i = 1, \ldots, L. \quad (1)$$

For example, for L=1, $p_0=0$ and $p_1=N_0$. This module will encode all code words into the base layer.

For L=2, $p_0=0$, $p_1=N_0$, $p_2=N_0+N_1$. In an embodiment, pixels with code word between $\{p_0, p_1\}$ will be coded in layer 0 and pixels with code words between $\{p_1, p_2\}$ will be encoded in layer 1. In general, given L layers, for each layer l, $s_l$ pixels at that layer are coded as;

$$s_l = \text{Clip3}(s, p_l, p_{l+1}-1) - p_l, \ l=0, 1, 2, \ldots, L-1, \quad (2)$$

where d=Clip3(s, a, b) denotes a clipping function, where d=s, if a≤s≤b, d=a, if s<a, and d=b, if s>b.

After layer decomposition (115), in an embodiment, each layer $s_l$ (117-l, l=0, 1, . . . , L−1) may be encoded independently by video encoders (120 to generate compressed bit streams (122). As discussed in the '388 application, in some embodiments, the system depicted in FIG. 1A may be modified to allow for inter-layer prediction as well. In such embodiments, a predictor may be used to estimate pixels values of the l-th layer based on pixel values of the l−1 layer; then instead of coding the pixel values of the l-th layer directly one simply encodes and transmits the residual between the actual values and the predicted values.

In some embodiments, the coded bit streams (122), the coded metadata (127), and other data (e.g. audio data), may be multiplexed into a single bit stream and transmitted to a decoder as a single, multiplexed, bit stream (not shown).

Figure 1B:
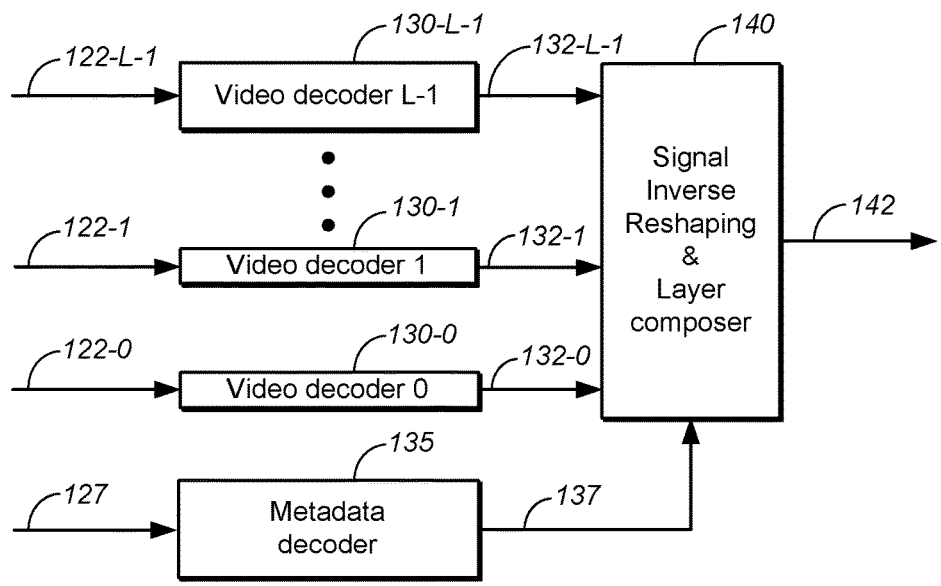
FIG. 1B depicts an example framework of EDR layered decoding according to an embodiment of the present invention.

FIG. 1B depicts an example framework of EDR layered decoding according to an embodiment of the present invention. As depicted in FIG. 1B, after demultiplexing of a received bit stream that may combine audio, video, and ancillary data (not shown), each of the received coded bit streams (122) is fed to an array of video decoders (130). Decoders (130) correspond to encoders (120) and generate one or more of decoded video signals (132). Using a signal inverse reshaping and layer composer (140) unit, the received layered signals are combined and inverse-shaped to generate signal $\hat{v}$ (142), which represents an estimate of the original EDR signal (102). In an embodiment, output EDR signal (142) may be generated as $$\hat{v} = f^{-1}\left(\sum_{i=0}^{L-1} \hat{s}_i\right), \quad (3)$$

where $f^{-1}()$ denotes the inverse (or a close approximation of the inverse) of the signal-reshaping function (110), and $\hat{s}_l$ denotes the reconstructed layer signals (132), representing a very close approximation of the original $s_l$ signals (117). As depicted in FIG. 1B, there is no inter-layer prediction between the received layers; however, as it is known in the art of video coding, the system can easily be extended to decoders where $\hat{s}_i$ signals are generated using received residual signals and inter-layer prediction.

EDR Signal Reshaping using a Power-Function

Figure 2:
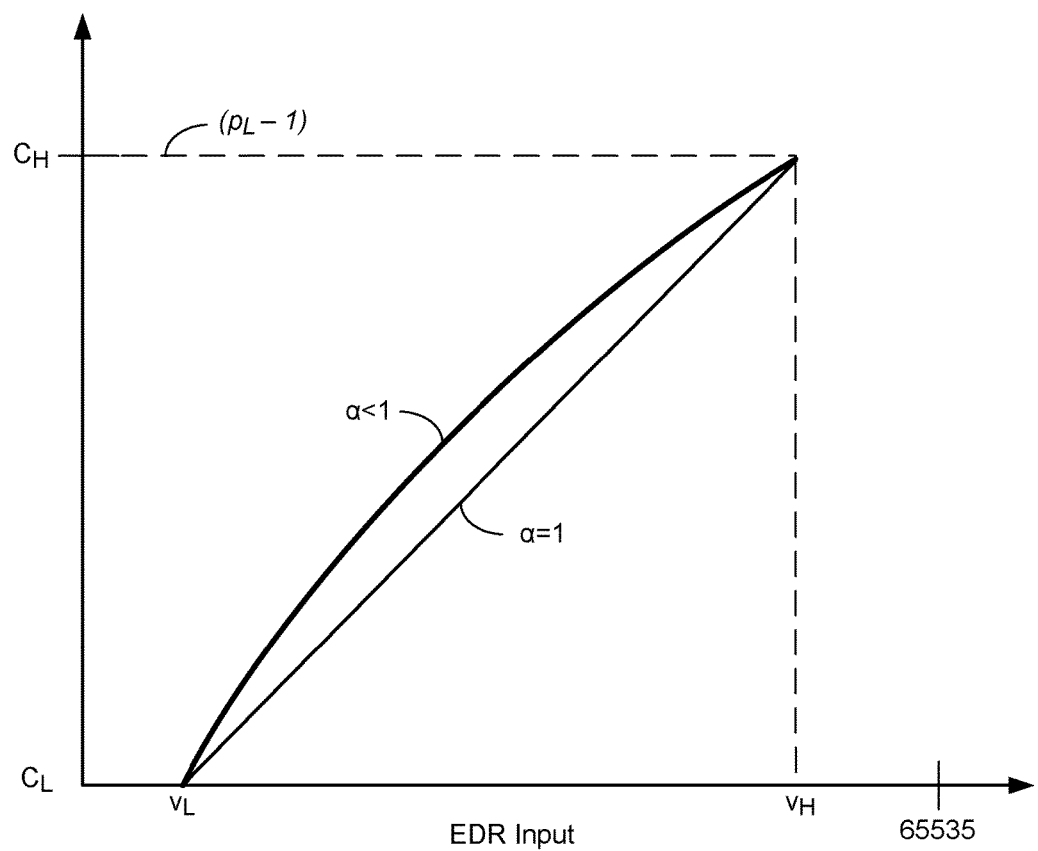
FIG. 2 depicts an example EDR-signal reshaping function based on a power function, wherein function parameter a is determined according to an embodiment of the present invention.

As described in the '388 application, for PQ-coded signals, in an embodiment, the signal reshaping function (110) may be expressed as:

$$s_i = \text{round}\left((c_H - c_L)\left(\frac{v_i - v_L}{v_H - v_L}\right)^\alpha + c_L\right), \quad (4)$$

where $v_L$ and $v_H$ denote the minimal value and maximal values in a color channel under consideration of the input EDR signal (102), and $c_L$ and $c_H$ denote the corresponding minimal and maximal output values. For example, in an embodiment, $c_L=0$ and $c_H=p_L-1$, as defined in equation (1). The value of $\alpha$ is constant, but may be adapted and changed on a per frame, per scene, or other suitable criterion basis. FIG. 2 depicts an example of the power reshaping function of equation (4) for $\alpha<1$. In an embodiment, if the input (112) is PQ-coded, then $\alpha>1$, otherwise, if the input (112) is gamma-coded, then $\alpha<1$.

In the '388 application, a method was described to determine an optimal value of $\alpha$ using a block-complexity metric ($M_{EDR}$) based on the standard deviation of pixels within a block or the difference between the minimum and maximum pixel values within the block. In addition to these metrics, other complexity measures could be applied based on either the spatial or frequency characteristics of a block. For example, $M_{EDR}$ may correspond to the variance of pixels in the block, the DC value of a block, or another function of its pixel values or DCT coefficients.

Figure 3:
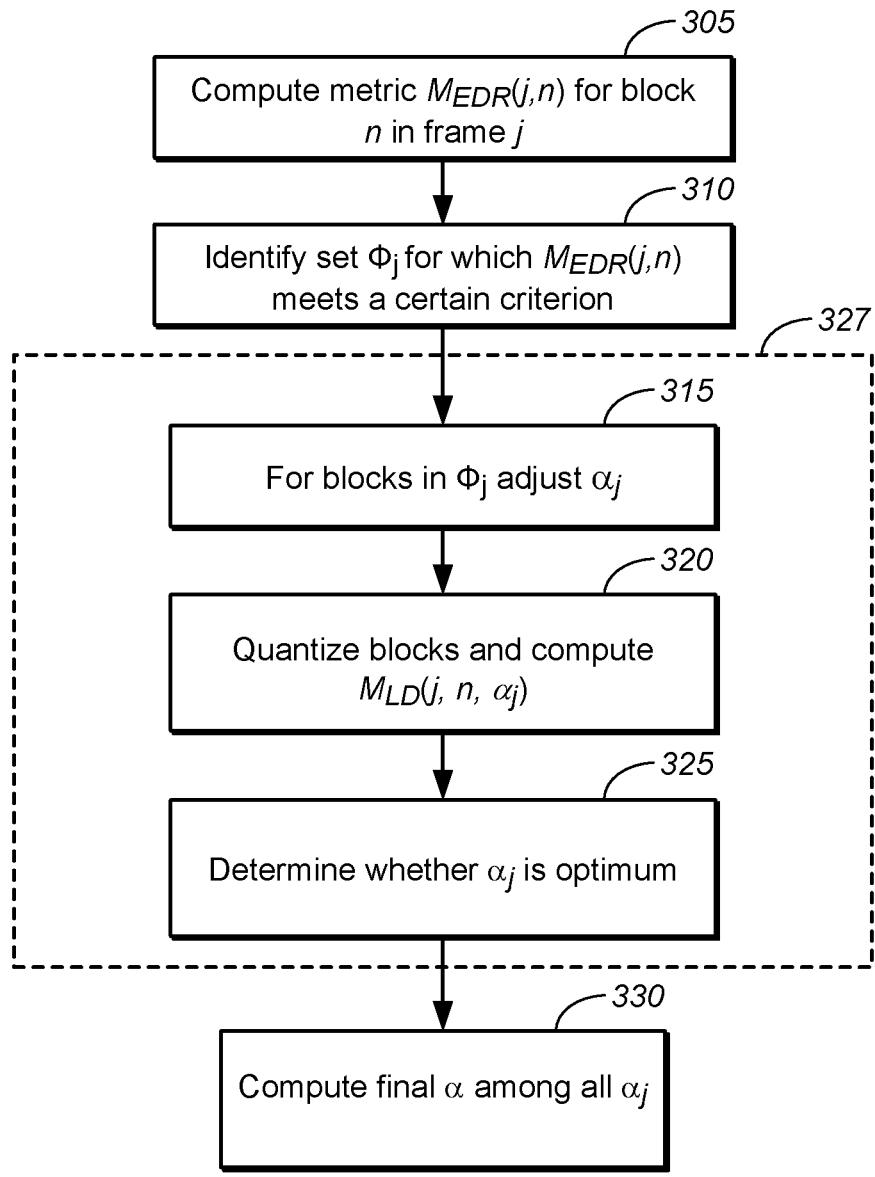
FIG. 3 depicts an example process for determining the optimum exponent of a forward shaping function for EDR inputs according to an embodiment of the present invention.

Consider a video scene that comprises F video frames, each frame partitioned into N blocks (e.g., each block is 8×8 pixels). The image blocks may be overlapping, or in a preferred embodiment, non-overlapping. FIG. 3 depicts a process for computing an optimal a based on a generalized block-complexity measure $M_{EDR}(j,n)$ (e.g., without loss of generality, the standard deviation of pixel values within a block).

As depicted in FIG. 3, after step (305), where $M_{EDR}(j,n)$ is computed for each block in all frames in the scene, in step (310), a set $\Phi_j$ is constructed that includes all image blocks for which a certain criterion is satisfied (e.g., $M_{EDR}(j,n)>T$, where T is a pre-specified threshold, say 0).

Steps (315), (320), and (325) comprise a loop (327) that is computed for a variety of $\alpha_j$ values within a predetermined range (e.g., MIN_$\alpha \leq \alpha_j \leq$ MAX_$\alpha$). For example, initially $\alpha_j$ may be set equal to 1 and then be increased or decreased depending on how the original EDR video data is coded. For example, for PQ-coded data it will be increased and for gamma-coded data it will be decreased. In step (320), using the given $\alpha_j$ and equation (4), the input data EDR is quantized and a new metric $M_{LD}(j,n,\alpha_j)$ may be computed for each quantized block. In some embodiments, complexity measure $M_{LD}$ may be identical to complexity measure $M_{EDR}$. In some other embodiments, the two complexity measures may be different. The more one quantizes the input EDR data, the more the characteristics of the quantized signal (112) will change. Ideally, the quantization (110) should distort the input as little as possible. In step (325), a measure of the distortion due to quantization may be applied to identify whether the selected $\alpha_j$ value is optimum or not. For example, in an embodiment, $\alpha_j$ may be selected as optimum if $$|\Phi_j| - \sum_{n \in \Phi_j}(M_{LD}(j, n, \alpha_j) > T_\sigma) == 0,$$

where $T_\sigma$ is another predetermined threshold (e.g., $T_\sigma=0$).

After all blocks in a scene have been quantized, an overall optimal alpha value is selected in step (330). For example, in an embodiment, for $\alpha>1$, the overall optimal $\alpha$ is selected as the one that is minimum across all optimum $\alpha_j$ values. Similarly, for $\alpha<1$, the overall optimal $\alpha$ is selected as the one that is maximum across all optimum $\alpha_j$ values.

In some embodiments, to adjust for quantization effects due to the lossy compression by video encoders (120), the overall optimum alpha may be further adjusted (e.g., $\alpha=\alpha+\Delta\alpha$, where $\Delta$ is a negative value when $\alpha>1$ and $\Delta$ is a positive value when $\alpha<1$). The same parameter optimization process may also be easily extended to other linear or non-linear quantization and reshaping functions characterized by more than one function parameter.

Table 1 provides in pseudo-code an example algorithm for reshaping gamma-coded values according to an embodiment based on the process depicted in FIG. 3, where the desired $\alpha<1$.

TABLE 1

Method to compute optimal $\alpha$ for gamma-coded EDR signals

//Initialize for each frame j within a scene of F total frames
$\alpha^{opt}[j] = 1.0$ for all j.
// for each frame
for( j = 0; j < F ; j++ ){
  // STEP 1.a : calculate complexity measurement for each block n in EDR
    domain
  Calculate $M_{EDR}$ (j, n) for all values of n
  // STEP 1.b : Identify those blocks that satisfy a complexity criterion
  Construct $\Phi_j = \{i \mid M_{EDR} (j, n) > T\}$
  // STEP 2: Apply the reshaping function and compute updated complexity metrics for different $\alpha$
  for( $\alpha_j$ = 1.0; $\alpha_j$ > MIN_a; $\alpha_j = \alpha_j$-0.1) {
    // STEP 2a: quantize EDR using power function with $\alpha_j$ $$s_{j,i} = \text{round}\left((c_H - c_L)\left(\frac{v_{j,i} - v_L}{v_H - v_L}\right)^{\alpha_j} + c_L\right)$$

// STEP 2b: calculate complexity measurement for each block after layer decomposition
    Calculate $M_{LD}(j, n, \alpha_j)$ for all n
    // STEP 2c: calculate whether given $\alpha_j$ causes near-zero deviation $$\text{if}\left(|\Phi_j| - \sum_{n \in \Phi_j}(M_{LD}(j, n, \alpha_j) > T_\sigma) == 0\right)$$

$\alpha^{opt}[j] = \alpha_j$
    else
      break;
    }
}
// STEP 3: find the maximal $\alpha^{opt}[j]$ as the final $\alpha$
  $\alpha = \max \{ \alpha^{opt}[j] \}$
//Apply optional safety margin
$\alpha = \alpha + \Delta\alpha$, In a decoder, the inverse shaping operation (140) can be expressed as $$\hat{v}_i = (v_H - v_L)\left(\frac{\hat{s}_i - c_L}{c_H - c_L}\right)^{1/\alpha} + v_L. \quad (5)$$

In some embodiments, the power function of equation (4) may be expressed as a piecewise linear polynomial, a piecewise 2-d or 3-d order polynomial, or a piecewise B-spline. In such implementations, it is suggested that smoothness and monotonicity constraints across the pieces should be enforced to avoid quantization-related artifacts. Then search methods similar to those described earlier or in the '388 application may be applied.

Block-Adaptive Reshaping Function

Figure 4:
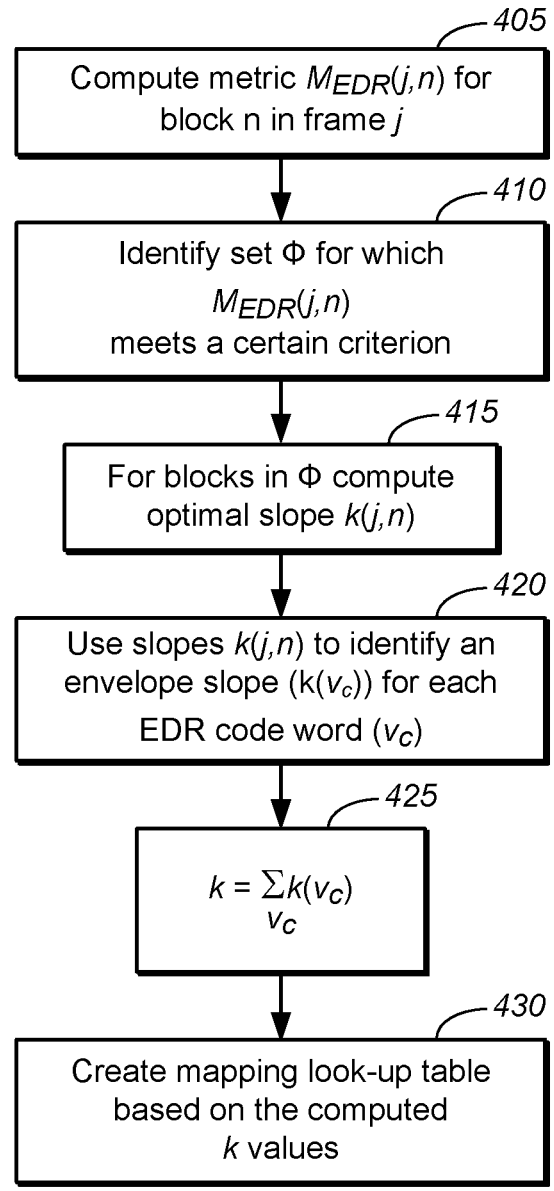
FIG. 4 depicts an example process for determining a forward mapping of EDR code words according to an embodiment of the present invention.

Consider again a video scene that comprises F video frames, each frame partitioned into N blocks (e.g., each block is 8×8 pixels). The image blocks may be overlapping, or in a preferred embodiment, non-overlapping. FIG. 4 depicts an example data flow for mapping input EDR code words (102) into reshaped output values (112), according to an embodiment.

As described before, one can define a block-based complexity measure ($M_{EDR}$). In an embodiment, in step (405), without loss of generality, consider the complexity measure to be computed based on the standard deviation (std) of the pixels in the block. Note that checking whether the standard deviation of block n in frame j (j=1, 2, . . . , F) is zero (e.g., $M_{EDR}(j,n)=std_{jn}=0$) is equal to checking whether the difference between the maximal value, (e.g., B(j, n)), in this block and the minimal value, (e.g., A(j, n)), in this block is 0.

Assuming the reshaping function (110) is constructed by a piecewise linear line, then for inputs $v_i \in [A(j,n)\ B(j,n)]$, a local quantizer can be expressed as:

$$s_i = \text{round}\left(k(j, n)(c_H - c_L)\left(\frac{v_i - v_L}{v_H - v_L}\right) + c_L\right), \quad (6)$$

where k(j, n) is a scaling factor to adjust the quantizer's slope at the n-th block in the j-th frame.

In step (410), let Φ denote a set of all blocks for which the block metric satisfies a certain criterion. For example, let Φ denote the set of all blocks that have non-zero standard deviation before quantization, or $$\Phi=\{(j,n)|B(j,n)-A(j,n)>0\}. \quad (7)$$

In an embodiment, given a threshold $T_{th}$, where, without loss of generality, $T_{th} \geq 1$, given a block's min and max pixel values, in step (415), an optimal k(j, n) may be derived as $$k(j, n) = T_{th}\frac{v_H - v_L}{(c_H - c_L)(B(j, n) - A(j, n))}. \quad (8)$$

Given the data {A(j, n), B(j, n), k(j, n)}, this triplet of values reveals that inside segment [A(j, n), B(j, n)], the quantizer should have a slope of at least k(j, n). Given that a particular EDR code (e.g., $v_c$) may belong to multiple [A(j, n), B(j, n)] segments, for EDR code word $v_c$, one needs to determine the maximal slope to satisfy all blocks for each code word.

Let $\theta(v_c)$ denote the set of all segments across all blocks that cover the code word $v_c$, or $$\theta(v_c)=\{(j,n)|A(j,n) \leq v_c \leq B(j,n),(j,n) \in \Phi\}. \quad (9)$$

Then, in step (420), the required slope at code word $v_c$ may be determined as the envelope of all optimal slopes within those blocks that belong to the $\theta(v_c)$ set, or $$k(v_c) = \max_{(j,n)\in\theta(v_c)} k(j, n). \quad (10)$$

In step (425), let the sum of all such envelope slopes be denoted as $$k = \sum_{v_c} k(v_c), \quad (11)$$

then, for each $v_c$ code word, without loss of generality, in step (430), a cumulative slope function may be defined as $$K(v_c) = \sum_{i=0}^{v_c} k(i). \quad (12)$$

To guarantee that all code words are mapped within the [$c_L$, $c_H$] bounds, the mapping from $v_c$ code words to $s_i$ values may be computed using $$\overline{K}(v_c) = \text{round}\left(\frac{c_H - c_L}{k}K(v_c)\right). \quad (13)$$

Given equation (13), a mapping between input $v_c$ values and output $s_i$ values may be computed using a forward-mapping look-up table (e.g., $LUT_F(v_c) = \overline{K}(v_c)$). In an embodiment, this table may be stored with the data or transmitted to a decoder as part of the image metadata (119) so that the decoder may reconstruct the inverse-mapping process.

In an example embodiment, Table 2 summarizes the mapping process depicted in FIG. 4 using pseudo code.

TABLE 2

```
// STEP 1: find max and min value
for( j = 0; j < F ; j++ ){
    for( n = 0; n < N; n++)
        // STEP 1.a : find the maximal value for each block n in EDR
domain
        Calculate B(j, n)
        // STEP 1.b : find the minimal value for each block n in EDR domain
        Calculate A(j, n)
    end
end
// STEP 2 : find block with (B(j, n) - A(j , n))> 0; i.e. non-zero std block
index
Construct Φ ={(j, n) | B(j, n) - A(j, n) > 0}
for each block in Φ
    // STEP 2.a: calculate optimal slope
```

$$k(j, n) = T_{th}\frac{v_H - v_L}{(c_H - c_L)(B(j, n) - A(j, n))}$$

```
end
// STEP 3: find optimal slope
for each valid EDR code word vc
    θ(vc) = {(j, n) | A(j, n) ≤ vc ≤ B(j, n), (j, n) ∈ Φ}
```

$$k(v_c) = \max_{(j,n)\in\theta(v_c)} k(j, n)$$

```
end
```

$$k = \sum_{v_c} k(v_c)$$

// STEP 4: find optimal EDR LUT by accumulating the slope and taking normalization $$K(v_c) = \sum_{i=0}^{v_c} k(i) \text{ for all } v_c, \text{ then}$$

$$\overline{K}(v_c) = \text{round}\left(\frac{c_H - c_L}{k}K(v_c)\right).$$

In some embodiments, in equation (12), alternative functions may be used to compute the cumulative slope function $K(v_c)$. For example, the $k(v_c)$ values may be filtered or weighted before being summed up, as in $$k(v_c) = \sum_{i=-u}^{u} w_i k(v_c + i), \quad (14)$$

where $w_i$ denote predetermined weights or filter coefficient of a filter with (2u+1) filter taps (e.g., u=2 and the filter coefficients correspond to those of a low-pass filter).

Figure 5:
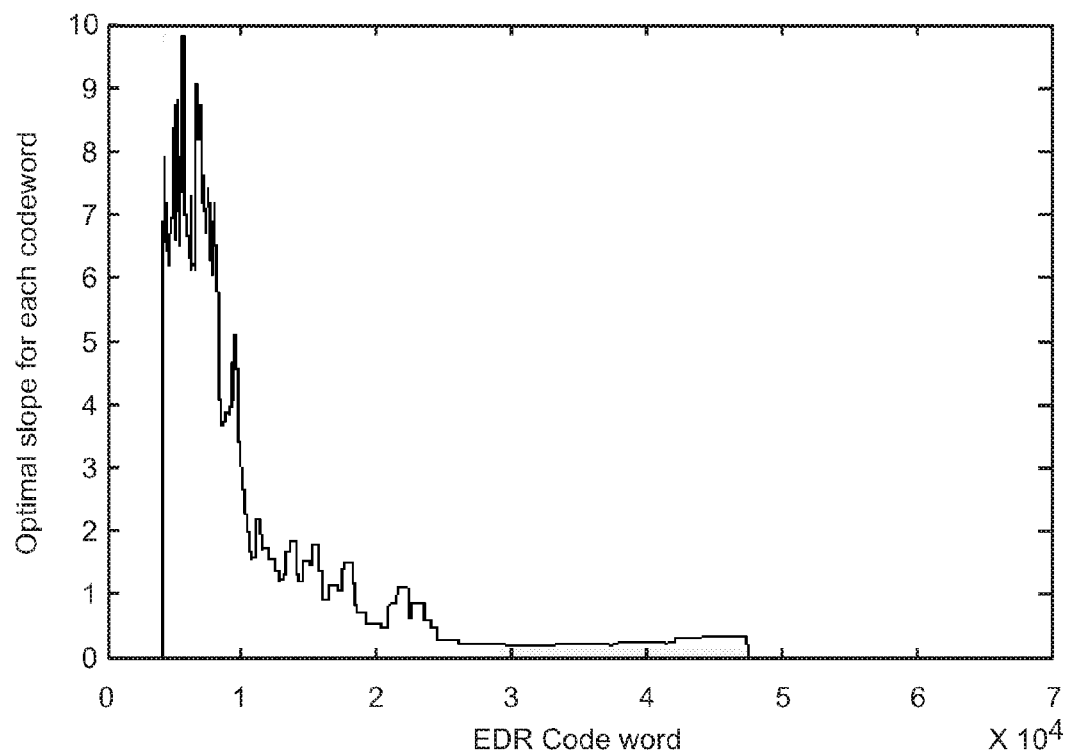
FIG. 5 depicts an example of intermediate mapping of input EDR code words ($v_c$) to block-based scaling factors ($k(v_c)$) computed according to an embodiment of the present invention.

FIG. 5 depicts an example plot of $v_c$ code words versus envelope slope $k(v_c)$ values for a test sequence of frames given the $[c_L, c_H]$ range of [0, 255].

Figure 6:
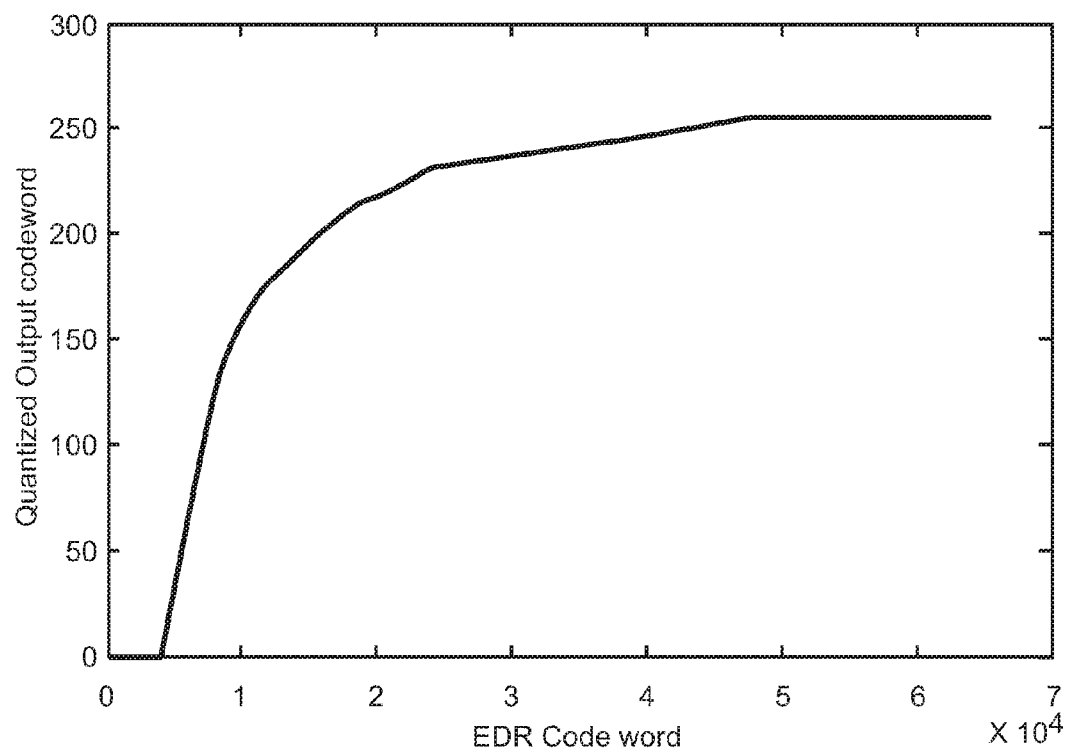
FIG. 6 depicts an example mapping of input EDR code words to the final output reshaped symbols according to an embodiment of the present invention.

Given the data depicted in FIG. 5, FIG. 6 depicts an example of the $v_c$ versus $\overline{K}(v_c)$ mapping.

Inverse Reshaping

In a decoder, given the $\overline{K}(v_c)$ values of equation (13), an inverse quantizer or reshaping function (140) may be determined as follows:
for each decoded code word $\hat{s}_c$, let $$\omega(\hat{s}_c) = \{i | \overline{K}(v_i) = \hat{s}_c\}, \quad (15)$$

then $$\overline{K}^{-1}(\hat{s}_c) = \frac{\sum_{i \in \omega(\hat{s}_c)} v_i}{|\omega(\hat{s}_c)|} \quad (16)$$

In other words, for a given code word in the quantized domain, the corresponding estimated EDR code word $\hat{v}_c$ is constructed by: first grouping all pixels having quantized value $\hat{s}_c$, finding the corresponding EDR code words, and then taking the average for all collected EDR code words. From equation (16), a backward look-up table $LUT_B(\hat{s}_c) = \overline{K}^{-1}(\hat{s}_c)$ may be constructed and either stored with the data or transmitted to the decoder, e.g., as part of metadata (119).

Figure 7:
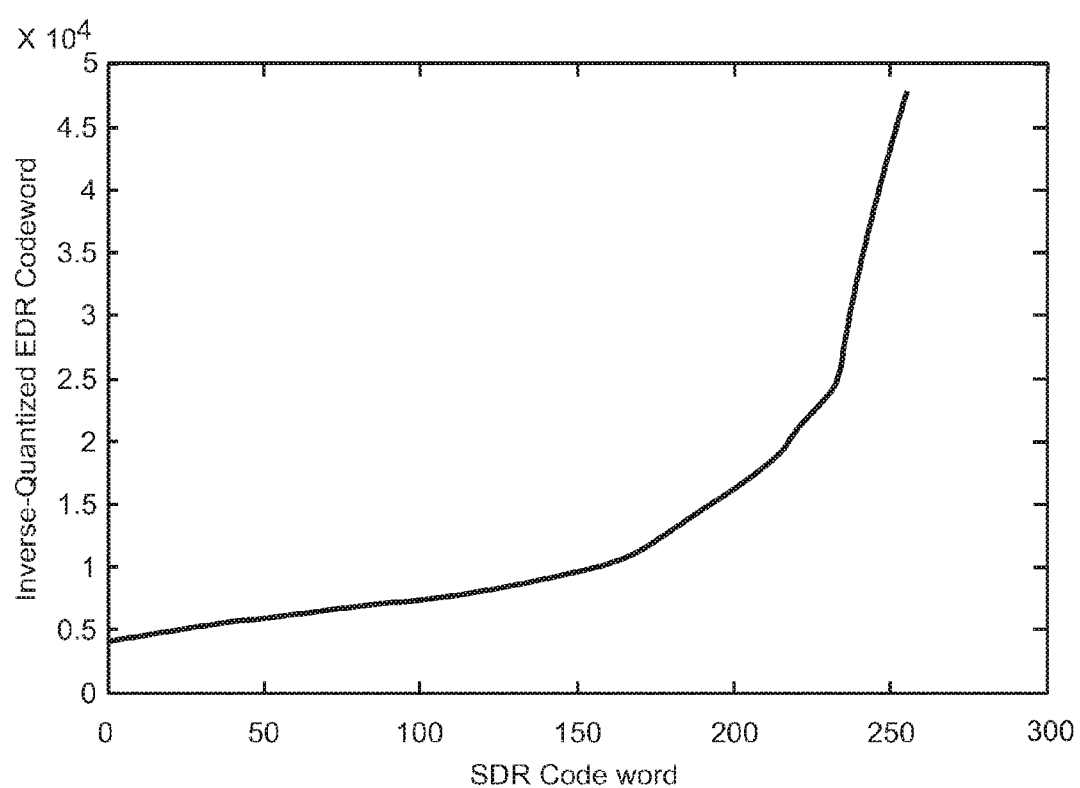
FIG. 7 depicts an example of reverse mapping computed according to an embodiment of the present invention.

Given the data depicted in FIG. 6, FIG. 7 depicts an example of $\hat{s}_c$ versus $\overline{K}^{-1}(\hat{s}_c)$ mapping or inverse reshaping (140).

In an embodiment, the mapping defined by the $\overline{K}^{-1}(\hat{s}_c)$ relationship may be transmitter to the decoder using metadata (119, 127). Such an approach may be too expensive in terms of bit rate overhead. For example, for 8-bit data, a look-up table may comprise 255 entries, to be transmitted each time there is a scene change. In other embodiments, the inverse mapping may be translated into a piecewise polynomial approximation. Such polynomials may typically comprise first and second-order polynomials, although, higher-order polynomials or B-splines could be used as well. The number of polynomials approximating a LUT for a certain layer l (l=0, 1, . . . , L-1) may vary according to available bandwidth and processing complexity. In an embodiment, the base layer uses up to 8 segments while the enhancement layer uses a single segment.

Table 3 depicts an example algorithm to approximate the decoder LUT table using second-order polynomials according to an embodiment.

TABLE 3

LUT approximation using 2d-order polynomials

// Input :
//     $LUT_B$ : Inverse reshaping lookup table

TABLE 3-continued

LUT approximation using 2d-order polynomials

```
//     ε       : maximal error tolerance between LUT values and
approximated values
//     N_l     : number of code words in layer l
//     p_l     : partition code word separating layer l-1 and l
// Output:
//     m_x(t) : pivot points for input
//     m_y(t): corresponding output value
//     a(i,j) : Polynomial coefficients
T = 0;                  // counter to count number of pivot points
Len_LUT = N_l;          // number of entries in the l^th layer
LUT[ x ] = LUT_B[ x + p_l ] ; // segment of backward reshaper used in
l^th layer
m_x(0) = 0;             // first pivot point ; input value
m_y(0) = LUT_B[p_l];    // first pivot point ; output value
converge = 0;           // flag to check convergence
while( ! converge ){
    found_one_seg = 0;
    cnt = 1;
    // find one segment which won't exceed the maximal tolerance error
    while( ~found_one_seg ){
        // STEP 1 : move pivot candidate to next feasible point
        m = m_x(T) + cnt;
        // STEP 2: approximate value from LUT[m_x(T )] to LUT[m]
        // by a 2nd order polynomial
        f( T , i) = a( T, 2 )* i^2 + a( T, 1) * i + a( T, 0)
        where a( T, 2), a( T, 1), and a( T, 0) are the fitted polynomial
        coefficients
        // Compute the maximum approximation error
        for( i = m_x(T ) ; i <= m ; i++){
            ε_i = f(T,i) − LUT(i)
        }
        ε_max = max{ε_i, i = m_x (T),...,m}
        // STEP 3.(a) if max error exceeds tolerance, take the previous
        one
        if( (ε_max > ε )&&( T < Len_LUT ) ){
            found_one_seg = 1;
            T++;
            m_x(T) = m − 1 ;
            m_y(T ) = LUT(m_x(T ) );
        }
        // STEP 3.(b) reach the last entry
        else if( (ε_max <= ε ) &&( m == Len_LUT ) ){
            found_one_seg = 1;
            T++;
            m_x(T ) = m;
            m_y(T ) = LUT(m_x(T ) );
            converge = 1
        }
        // STEP 4: increase the counter
        cnt ++;
    }
}
```

As depicted in Table 3, in an embodiment, inputs to the approximation process include: the original look-up table (computed, say, using equation (16)), an acceptable error tolerance between the values in the LUT and those generated by the polynomial approximation, the number of available code words, and its first code word value (see equation (1)). The output may include the end-points of each polynomials (also referred to as pivot points), and the polynomial coefficients.

Starting from the first pivot point, the algorithm attempts to fit the maximum possible range of available code words using, without loss of generality, a second degree polynomial. Any known polynomial-fit algorithms may be used, such as mean-square error polynomial fit, and the like.

When the computed maximum error exceeds the input tolerance, then the parameters of the optimal polynomial are stored, and a search for new polynomial starts, until the whole LUT table is mapped.

In some embodiments, the number of polynomials that may be used to approximate a LUT may be constrained to a fixed value, say eight. In that case, a higher tolerance for error may be incorporated in to the algorithm.

The method of Table 3 may also be easily modified to accommodate other approximation functions, such as higher-order polynomials, B-splines, or a combination of approximation functions.

Coding in Perceptually Uniform Color Spaces

Video signals are typically rendered in the familiar RGB color space; however, most video compression standards, such as MPEG-2, H.264 (AVC), H.265 (HEVC), and the like, have been optimized to operate in an opponent color space, such as YCbCr or YUV. These color spaces are adequate for coding and transmitting 8-10 bit standard-dynamic range (SDR) video, however, from a bits per pixel requirements point of view, they may not be the most efficient when coding and transmitting EDR video. For example, in the past, the Lu'v' and Log(L)u'v' color spaces have also been suggested.

As appreciated by the inventors, encoding of signals in perceptually uniform spaces may benefit by additional processing of the u' and v' chromaticity data before being processed by a video codec. For example, in an embodiment, in an encoder, such processing may be performed on input signal (102) as part of the signal reshaping process (110).

White Point Translation

In an embodiment, the conversion from linear XYZ to a Luma u'v' color space may comprise the following steps:
  a) Define the coordinates of the White Point (e.g., D65)
  b) Solve for Luma=f(Y), and
  c) Solve for u' and v' from X, Y, and Z As used herein, the function f(Y) denotes any lightness-related function, such as L (or L'), log(L), and the like. In a preferred embodiment, f(Y) may represent the perceptual quantization (PQ) mapping function as described in the '212 Application.

In an embodiment, the white point may be defined as D65 (6500K) with u' and v' coordinates:
Du=d65u=0.1978300066428;
Dv=d65v=0.4683199949388;

In an embodiment, u' and v' may be derived as $$u' = \frac{4X}{X + 15Y + 3Z}, \quad (17a)$$

$$v' = \frac{9Y}{X + 15Y + 3Z}, \quad (17b)$$

if (X+15Y+3Z)≠0, and $$u'=Du \quad (17c)$$

$$v'=Dv \quad (17d)$$

if (X+15Y+3Z)=0.

The inverse operation comprises:
  a) Define the coordinates of the White Point (e.g., D65)
  b) Solve for Y=f$^{-1}$(Luma)
  c) Solve for X and Z from u' and v'

For example, in an embodiment that uses a perceptual quantization function according to the '212 Application, one may apply the corresponding inverse PQ mapping to generate the Y pixel values.

In an embodiment, X and Z may be derived as:

$$X = Y\frac{9u'}{4v'}, \quad (18a)$$

$$Z = Y\frac{12 - 3u' - 20v'}{4v'}, \quad (18b)$$

if v'≠0, and $$X=Z=Y, \text{ if } v'=0. \quad (18c)$$

Figure 8A:
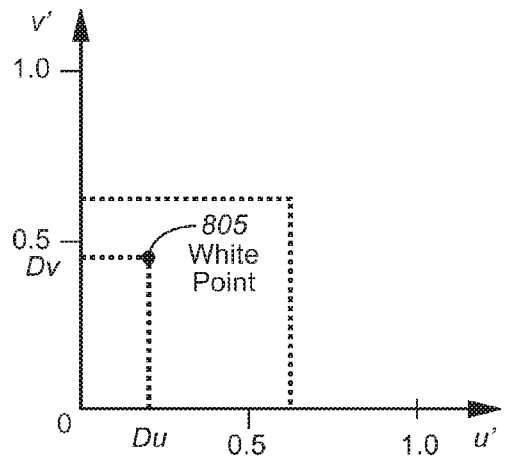
FIG. 8A and FIG. 8B depict an example of chromaticity range scaling according to an embodiment of the present invention.

FIG. 8A depicts a traditional mapping of a white point (805) (e.g., D65) in the u'v' chromaticity space. As depicted in FIG. 8A, the range of the u' and v' chromaticity values is approximately (0, 0.623) for u' and (0, 0.587) for v'. As depicted in FIG. 8A, the D65 white point is not centered in the u'v' signal representation. This may result in color shifts after sub-sampling and up-sampling the chroma components to translate between the original 4:4:4 color format and the 4:2:0 or 4:2:2 color formats typically being used in video coding. To alleviate such color shifts, it is suggested to apply a transform function to the chromaticity values. In one embodiment, the transform function shifts the white point approximately to the center of the translated u'v'; however, the white point may be translated to any other color value where one may want to see chroma errors to gravitate. For example, if translated values u'$_t$ and v'$_t$ are in the range (0, 1), then the following mapping may be applied:

$$u'_t=(u'-Du)a_1+b_1, \quad (19a)$$

$$v'_t=(v'-Dv)a_2+b_2, \quad (19b)$$

where Du and Dv denote the original u' and v' coordinates of the selected white point, (b$_1$, b$_2$) determine the coordinates of the desired position of the white point in the translated color space, and a$_i$ (i=1, 2) are constants computed based on the desired translation point and the minimum and maximum values of u' and v'. In one embodiment, the translation parameters (e.g., a$_1$ and a$_2$) may be fixed for the whole video sequence. In another embodiment, the translation parameters may be computed on a per scene or per frame basis to take advantage of changes in the chromaticity range of the incoming content.

Figure 8B:
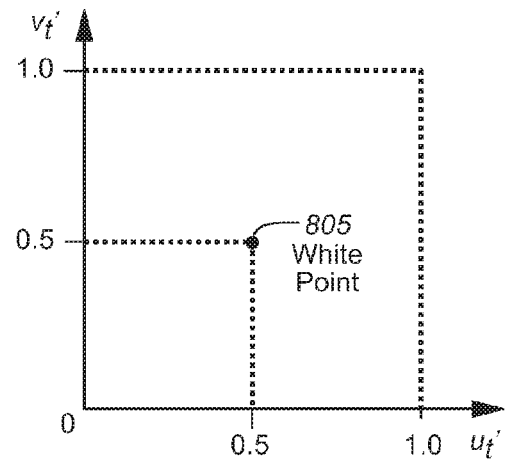

FIG. 8B depicts a mapping of the white point (805) in the translated chromaticity space according to an example embodiment. In FIG. 8B, the original u' and v' chromaticity values are translated so that the selected point (e.g., D65) is approximately at the center (0.5, 0.5) of the translated chromaticity space. For example, if translated values u'$_t$ and u'$_t$ are in (0, 1), then for b$_1$=b$_2$=0.5, in one embodiment, the following mapping may be applied:

$$u'_t=(u'-Du)1.175+0.5, \quad (20a)$$

$$u'_t=(v'-Dv)1.105+0.5, \quad (20b)$$

where Du and Dv denote the u' and v' coordinates of the selected white point. This translation will result in chroma errors appearing as a desaturation rather than as a hue shift. A person of ordinary skill in the art will appreciate that a non-linear function may also be applied to the u' and v' chromaticity values to achieve the same translation. Such a non-linear function may allocate higher precision to near-neutrals to further decrease the visibility of color errors due to coding and quantization.

Reducing Chroma Entropy

The visibility of chroma detail may be further improved if the u' and v' pixel components are multiplied by a function of the luminosity. For example, in an embodiment, the translated chromaticity values may be derived as:

$$u'_t = g(Luma)(u'-Du)a_1 + b_1, \quad (21a)$$

$$v'_t = g(Luma)(v'-Dv)a_2 + b_2, \quad (21b)$$

where g(Luma) denotes a function of the luma channel. In an embodiment, g(Luma)=Luma.

In a decoder, the incoming signal may be denoted as Luma $u'_t v'_t$. In many applications, this signal must be converted back to XYZ, RGB, or some other color space before further processing. In an example embodiment, the color conversion process from Luma $u'_t v'_t$ to XYZ may comprise the following steps:

a) Undo the Luma encoding $$Y = f^{-1}(Luma)$$

b) Undo the range scaling on the $u'_t$ and $v'_t$ values to recover u' and v' c) Use equation (18) to restore X and Z

In some embodiments, the Luma, $u'_t$ and $v'_t$ components of the incoming signal may be normalized into the (0, 1) range before any color transformations. In some embodiments, equations (17)-(21) may be implemented using a combination of look-up tables, multiplications, and additions. For example, in an embodiment, let $$Y = f^{-1}(Luma),$$

$$B = 3u',$$

$$C = 20v', \text{ and}$$

$$D = 1/(4v')$$

denote the outputs of three look-up tables with Luma, u', and v' as their inputs, then, from equation (18), the X, and Z values may be computed using four multiplications and two additions as:

$$Z = (Y*D)*(12-B-C),$$

and $$X = (Y*D)*(3*B).$$

For example, in an embodiment, for a 10-bit encoded signal, each LUT may have 1024 entries, each at a high-enough precision (e.g., 32 bits) for the target application.

Figure 9:
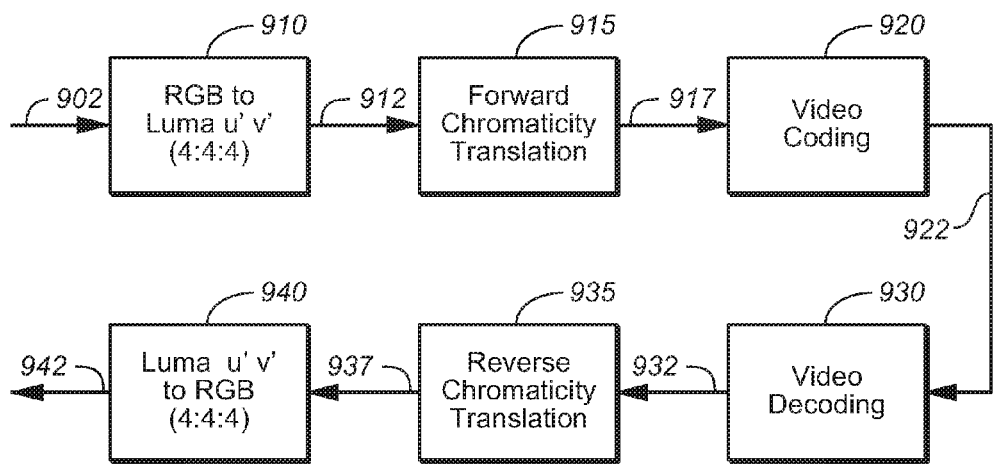
FIG. 9 depicts an example of a coding and decoding pipeline according to an embodiment of the present invention.

FIG. 9 depicts an example of a coding and decoding pipeline according to an embodiment of the present invention. Input signal (902) may be in RGB 4:4:4 or any other suitable color format. In step (910), signal (902) is translated to a perceptual Luma u'v' format, for example, using a perceptual quantization (PQ) mapping for the luminance value and equations (17) for the chromaticity values. In step (915), a transform, for example as depicted in equations (19)-(21) is applied to translate the original u'v' chromaticity values to translated chromaticity values $u'_t$ and $v'_t$ so that the white point is placed approximately at the center of the translated chromaticity space. The color-transformed and translated Luma $u'_t v'_t$ 4:4:4 signal (e.g., 917) may be color sub-sampled (not shown) to a 4:2:0 or 4:2:2 format before being coded by a video encoder (920). Video encoder (920) may comprise signal reshaping (110) and layer decomposition (115) processes as described earlier. On the receiver, video decoder (930) generates a decoded signal (932). Video decoder (930) may comprise signal inverse reshaping and layer composer (140). After optional color up-sampling (e.g., from 4:2:0 to 4:4:4), a reverse chromaticity translation step (935) may translate the Luma $u'_t v'_t$ signal (932) back to a Luma u'v' signal (937), by reversing the translation operations in (915). Finally, Luma u'v' signal (937) may be translated to an output signal (942) in the RGB or other appropriate color space for display or further processing.

Coding in Perceptually Quantized IPT Color Space

White point translation may be applied to other color spaces as well, such as the IPT color space or the IPT-PQ color space, a perceptually quantized color space that appears to be ideally suited for the coding of video signals with enhanced or high dynamic range. The IPT-PQ color space was first described in PCT Application PCT/US2014/016304, filed on Feb. 13, 2014, titled "Display management for high dynamic range video," by R. Atkins et al., which is incorporated herein by reference in its entirety.

The IPT color space, as described in "*Development and testing of a color space (ipt) with improved hue uniformity*", by F. Ebner and M. D. Fairchild, in Proc. $6^{th}$ Color Imaging Conference: Color Science, Systems, and Applications, IS&T, Scottsdale, Ariz., November 1998, pp. 8-13 (to be referred as the Ebner paper), which is incorporated herein by reference in its entirety, is a model of the color difference between cones in the human visual system. In this sense it is like the YCbCr or CIE-Lab color spaces; however, it has been shown in some scientific studies to better mimic human visual processing than these spaces. Like CIE-Lab, IPT is a normalized space to some reference luminance. In an embodiment, the normalization may be based on the maximum luminance of the target display.

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. Examples of PQ mapping functions are described in the '212 application, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve, as determined by the '212 application, imitates the true visual response of the human visual system using a relatively simple functional model.

Table 1 describes the calculation of the Perceptual Curve EOTF for converting digital video code values into absolute linear luminance levels at a point of display. Also included is the inverse EOTF (OETF) calculation for converting absolute linear luminance into digital code values

TABLE 1

Exemplary Equation Definitions:

D = Perceptual Curve digital code value, SDI-legal unsigned integer, 10 or 12 bits b = number of bits per component in digital signal representation, 10 or 12

V = normalized Perceptual Curve signal value, $0 \leq V \leq 1$

TABLE 1-continued

Y = normalized luminance value, 0 ≤ Y ≤ 1
L = absolute luminance value, 0 ≤ L ≤ 10,000 cd/m²
Exemplary EOTF Decode Equations:

$$V = \frac{D - 4 \cdot 2^{b-10}}{1015 \cdot 2^{b-10}}$$

$$Y = \left(\frac{\max[(V^{1/m} - c_1), 0]}{c_2 - c_3 V^{1/m}}\right)^{1/n} \quad (t1)$$

L = 10,000 · Y
Exemplary OETF Encode Equations:

$$Y = \frac{L}{10,000}$$

$$V = \left(\frac{c_1 + c_2 Y^n}{1 + c_3 Y^n}\right)^m \quad (t2)$$

$$D = \text{INT}(1015 \cdot V \cdot 2^{b-10}) + 4 \cdot 2^{b-10} \quad (t3)$$

Exemplary Constants:

$$n = \frac{2610}{4096} \times \frac{1}{4} \approx 0.15930176$$

$$m = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Notes:
1. The operator INT returns the value of 0 for fractional parts in the range of 0 to 0.4999 . . . and +1 for fractional parts in the range of 0.5 to 0.9999 . . . , i.e. it rounds up fractions above 0.5.
2. All constants are defined as exact multiples of 12 bit rationals to avoid rounding concerns.
3. R, G, or B signal components are to be computed in the same way as the Y signal component described above.

Converting a signal to the IPT-PQ color space may include the following steps:

a) Convert the signal from the input color space (e.g., RGB or YCbCr) to XYZ b) Convert the signal from XYZ to IPT-PQ as follows:

a. Apply a 3×3 XYZ to LMS matrix to convert the signal from XYZ to LMS b. Convert each color component of the LMS signal to a perceptually-quantized LMS signal (L'M'S' or LMS-PQ) (e.g., by applying equation (t2))

c. Apply a 3×3 LMS to IPT matrix to convert the LMS-PQ signal to the IPT-PQ color space Examples of the 3×3 XYZ to LMS and L'M'S' (or LMS-PQ) to IPT conversion matrices may be found in the Ebner paper. Assuming the chroma components of the IPT-PQ signal (e.g., P' and T') are in the range (−0.5, 0.5), a bias a (e.g., a=0.5) may be added so that the range of the chroma components is substantially within the range (0, 1), e.g.:

$$P' = P' + a \quad (22a)$$

$$T' = T' + a \quad (22b)$$

The inverse color operation may include the following steps:

a) Subtract any bias values that were added to the chroma components b) Apply a 3×3 I'P'T' to LMS conversion matrix to convert from IPT-PQ to LMS-PQ c) Apply an inverse PQ function to convert from LMS-PQ to LMS (e.g., using equation (t1))

d) Apply a 3×3 LMS to XYZ transform to convert from LMS to XYZ, and e) Convert from XYZ to the device-dependent color space of choice (e.g., RGB or YCbCr).

In practice, color transformation steps during encoding and/or decoding may be performed using pre-computed 1-D Look-up tables (LUTs).

Reducing Chroma Entropy

As described earlier, the visibility of chroma detail may be further improved if the P' and T' pixel components are multiplied by a function of the luminosity (e.g., I'). For example, in an embodiment, the translated chromaticity values may be derived as:

$$P'_t = g(I')(P' - a) + a, \quad (23a)$$

$$T'_t = g(I')(T' - a) + a, \quad (23b)$$

where g(I') denotes a linear or non-linear function of the luma channel (I'). In an embodiment, g(I')=I'.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to adaptive reshaping techniques for the layered coding of video images with enhanced dynamic range (EDR), such as those described herein. The computer and/or IC may compute any of a variety of parameters or values that relate to the adaptive reshaping processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive reshaping techniques for the layered coding of video images with enhanced dynamic range (EDR), as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to the adaptive reshaping techniques for the layered coding of video images with enhanced dynamic range (EDR), are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to reduce chroma-related artifacts during video coding, the method comprising:
   accessing an input signal in a color space comprising a luma component and two chromaticity components;
   determining original white point chromaticity coordinates (Du, Dv) of a white point in the color space of the input signal;
   translating using a chromaticity translation function the input signal to a second signal in a translated color space comprising two translated chromaticity components, wherein the chromaticity translation function shifts the original white point chromaticity coordinates to a predetermined second set of coordinates in the translated chromaticity color space; and
   encoding the second signal to generate a coded bit stream, wherein the method is performed by one or more processors.

2. The method of claim 1, wherein the input color space comprises a perceptually quantized luma component (Luma) and u' and v' chromaticity components.

3. The method of claim 1, wherein the chromaticity translation function comprises computing $$C0_t = (C0-Dc)a0+b0,$$

$$C1_t = (C1-Dv)a1+b1,$$

wherein C0 and C1 denote input chromaticity values, $C0_t$ and $C1_t$ denote the translated chromaticity values, Dc and Dv denote the original white point coordinate values, a1 and a2 are constants, and b1 and b2 are the coordinate values of the predetermined second set of the white point coordinates.

4. The method of claim 3 wherein b0 and b1 are approximately equal to 0.5 and a1 and a2 are between 1.0 and 1.5.

5. The method of claim 1, wherein the chromaticity translation function comprises computing $$C0_t = g(Luma) (C0-Dc)a0+b0,$$

$$C1_t = g(Luma) (C1-Dv)a1+b1,$$

wherein C0 and C1 denote input chromaticity values, $C0_t$ and $C1_t$ denote the translated chromaticity values, Dc and Dv denote the original white point coordinate values, a1 and a2 are constants, b1 and b2 are the coordinate values of the predetermined second set of the white point coordinates, and g(Luma) denotes a function of the Luma component.

6. The method of claim 1, further comprising subsampling the chromaticity components of the second signal before the encoding step.

7. The method of claim 1, wherein the predetermined second set of coordinates of the white point is approximately at the center of the translated chromaticity color space.

8. The method of claim 1, wherein the chromaticity translation function comprises computing $$C0_t = g(I) (C0-a)+a,$$

$$C1_t = g(I) (C1-a)+a,$$

wherein C0 and C0 denote input chromaticity values, $C0_t$ and $C0_t$ denote the translated chromaticity values, g(I) denotes a function of the Luma component of the input signal, and a is a constant, wherein C comprises a chroma component of the signal in a perceptually quantized IPT color space (IPT-PQ), and I comprises the luma component of the signal in the perceptually quantized IPT color space.

9. In a decoder, a method to decode a video signal encoded in a translated color space, the method comprising:
   receiving a coded bitstream in a translated color space comprising a luma component and two translated chromaticity components, wherein the two translated chromaticity components were translated by an encoder based on a chromaticity translation function and a set of original white point chromaticity coordinates;
   generating a decoded signal by decoding the coded bit stream;
   translating using the original white point chromaticity coordinates and an inverse of the chromaticity translation function the decoded signal to an output signal in a color space comprising two original chromaticity components, wherein, in the encoder, the chromaticity translation function shifts the original white point chromaticity coordinates to a predetermined second set of coordinates in the translated chromaticity color space,
   wherein the method is performed by one or more processors.

10. The method of claim 9, wherein the chromaticity translation function comprises computing $$C0_t = (C0-Dc)a0+b0,$$

$$C1_t = (C1-Dv)a1+b1,$$

wherein C0 and C1 denote input chromaticity values, $C0_t$ and $C1_t$ denote the translated chromaticity values, Dc and Dv denote the original white point chromaticity coordinates, a1 and a2 are constants, and b1 and b2 are the coordinate values of the predetermined second set of the white point coordinates.

11. The method of claim 9, wherein the chromaticity translation function comprises computing $$C0_t = g(Luma) (C0-Dc)a0+b0,$$

$$C1_t = g(Luma) (C1-Dv)a1+b1.$$

wherein C0 and C1 denote input chromaticity values, $C0_t$ and $C1_t$ denote the translated chromaticity values, Dc and Dv denote the original white point chromaticity coordinates, a1 and a2 are constants, b1 and b2 are the coordinate values of the predetermined second set of the white point coordinates, and g(Luma) denotes a function of the Luma component of the input signal.

12. An apparatus to reduce chroma-related artifacts during video coding, the apparatus comprising:
  an input to receive an input signal in a color space comprising a luma component and two chromaticity components;
  a processor and memory to:
    determine original white point chromaticity coordinates (Du, Dv) of a white point in the color space of the input signal;
    translate using a chromaticity translation function the input signal to a second signal in a translated color space comprising two translated chromaticity components, wherein the chromaticity translation function shifts the original white point chromaticity coordinates to a predetermined second set of coordinates in the translated chromaticity color space; and
    encode the second signal to generate a coded bit stream; and
  an output to output the coded bit stream.

13. A non-transitory computer-readable storage medium having stored thereon computer-executable instruction for executing a method with one or more processors in accordance with claim 1.

* * * * *